Feb. 19, 1946. G. G. LANDIS 2,395,053
WELDER'S SHIELD
Filed April 16, 1943
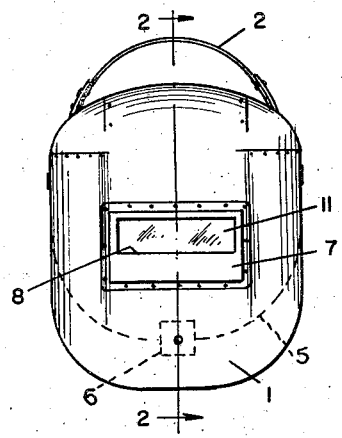
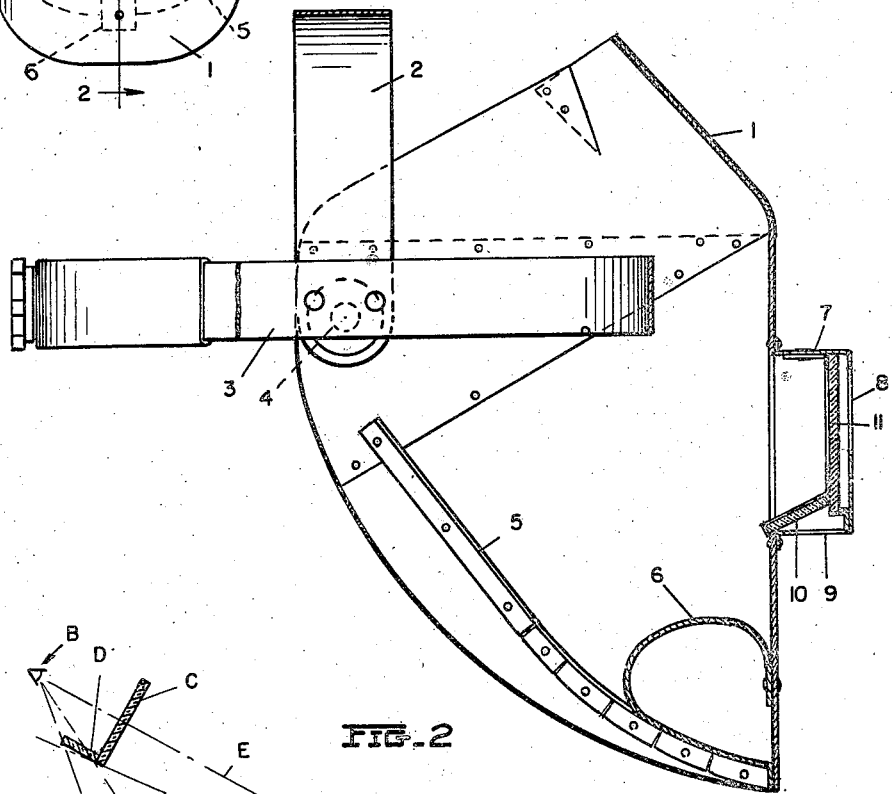
INVENTOR.
GEORGE G. LANDIS
BY
Oberlin, Limbach & Day.
ATTORNEYS Patented Feb. 19, 1946

2,395,053

UNITED STATES PATENT OFFICE 2,395,053

WELDER'S SHIELD

George G. Landis, University Heights, Ohio, assignor to The Lincoln Electric Company, Cleveland, Ohio, a corporation of Ohio Application April 16, 1943, Serial No. 483,261

6 Claims. (Cl. 2—8)

This invention relates as indicated to welder's shields such as are used for the purpose of protecting the face and head portions of a welding operator engaged in the process of electric arc welding.

This invention has for its principal object the provision of a shield having a plurality of sight openings, of different degrees of transparency. One of these openings is provided with a lens which is relatively transparent so that the operator may, under ordinary conditions of illumination, observe the position of the welding electrode with respect to the work. The other sight opening is provided with a more opaque lens capable of providing protection from the arc of the welding zone under ordinary conditions of illumination.

It is a further and more particular object of my invention to provide a relative arrangement of the two lenses or sight openings as aforesaid so that the operator will, more or less as a normal reflex action, so shift his line of vision from the more transparent opening to the more opaque opening as the occasion demands.

Other objects of my invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing—

Fig. 1 is a front elevation view of a welder's shield constructed in accordance with my invention;

Fig. 2 is a transverse sectional view of the shield taken on a plane substantially indicated by the line 2—2 in Fig. 1; and Fig. 3 is a diagrammatic representative of the arrangement of lenses which comprises my invention.

Broadly stated, this invention comprises the provision of a face shield having in combination in the front portion thereof two vertically adjacent lenses of different degrees of opacity with the upper lens the more opaque, said lenses so arranged that when the wearer's head is adjusted to view a point source of light through the upper lens, no direct rays from such point source will pass through the lower lens.

The invention is diagrammatically illustrated in Fig. 3 in which A represents a point source of light such as an electric arc; B represents the eye of the wearer of the shield; C represents the more opaque lens, through which the arc is normally observed in operation; and D is the second lens which is normally of greater transparency than lens C.

In Fig. 3, the two lenses have been illustrated arranged substantially at right angles. From the ensuing description, it will be found, however, that the angular relationship between the lenses may be varied somewhat while retaining the fundamentals of the invention as illustrated in Fig. 3. The center ray E is the line along which the wearer of the shield normally observes the point source of light A. The ray F denotes the lower limit of the direct rays intercepted by the lens C, and the rays G denote the limits of the field of vision of the operator's eye through the lens D.

Stated in another way, my invention comprises so arranging the lens D with respect to the lens C so that it lies within the shadow of the lens C and its appertenances, with respect to light emitted from the point source to be observed such as the arc A. The arrangement illustrated in Fig. 3 makes it clearly evident that even with lens D thus arranged in the "shadow" of the lens C, the operator may, by raising his head, so shift the lens assembly in a counter-clockwise direction about the axis of his eye as viewed in Fig. 3, as to bring light point A within the field subtended by the rays G. He may thus by raising his head view, through the relatively transparent lens D, the electrode and the position where the arc is to be struck. After the parts are properly positioned, he drops his head, or more accurately the lens assembly, into the position illustrated in Fig. 3, whereupon, the arc may be safely struck.

From the foregoing, it is believed that the broad principles of my invention, as illustrated in Fig. 3, will be fully understood. In Figs. 1 and 2, I have shown an embodiment of the invention in a specific form of welder shield which is, however, but one of the many possible embodiments of the invention. The shield illustrated in Figs. 1 and 2 comprises a head and face mask generally indicated at 1, the contour of which, in so far as the same overlies the face, chin, and stated portions of the wearer is more or less conventional.

The shield is provided with a head engaging harness comprising a U-shaped band 2, adapted to extend over the top of the head of the wearer, and a closed band generally indicated at 3, adapted to pass around the wearer's head in the region of the forehead. The harness thus provided is pivotally secured to the shield as at 4, so that with the harness fixed on the head of the wearer, the shield may be tipped up over the head of the wearer when not in use.

The lower portion of the face shield is, along opposite sides, provided with inwardly projecting flanges 5 for the purpose of not only reducing reflected glare on the inside of the shield, but also for the purpose of protecting the cheek portions of the operator. In the lower portion of the shield there is provided a chin rest 6. The member 6 is so positioned that it will, when the shield is lowered to an operative position, strike the chin of the wearer and consequently maintain the front face portion with the sight openings, hereinafter more specifically defined, in proper alignment with the eyes of the wearer.

The construction described thus far is more or less conventional. My invention is primarily concerned with disposition of the lenses in the sight openings through which the operator views the area in which the welding operation is performed.

Projecting forwardly from the face of the shield is a rectangular housing generally indicated at 7, which is provided with two sight openings 8 and 9, the first of which is disposed in a plane substantially parallel with the wearer's face while the second is disposed below and at approximately a right angle to such first opening. The two dimensions of the sight opening 8 are clearly shown in Fig. 1. The narrow dimension of the sight opening 9 is illustrated in Fig. 2. The long dimension of the opening 9 is preferably the same as the long dimension of the opening 8.

Mounted across the opening 9, in preferably the angular position shown in Fig. 2, is a lens 10 which is preferably formed of such material, i. e. tinted glass, that the operator may, by looking through it, fairly distinctly observe nearby objects under conditions of ordinary room illumination. The amount by which the full transparency of the lens 10 is reduced will determine the degree of protection afforded by this lens against the intense and quite harmful rays of the welding arc, during such periods as the operator may accidentally hold the shield in the wrong position.

The transparency of the lens 10 may be reduced to such an extent that it is capable of providing substantial protection against the intense rays of the electric arc for relatively short periods of time, while at the same time being of sufficient transparency for the operator to clearly distinguish nearby objects in an ordinary lighted room.

Mounted across the opening 8 is a lens 11 which is considerably more opaque than the lens 10, and which is capable of affording full protection against the rays of the arc for sustained intervals of time. For facility in the identification of the lenses 10 and 11 in the remaining portions of this specification and in the appended claims, the lens 10 of the transparency characteristics as above defined will be, for convenience, hereinafter referred to as a "semi-transparent lens." The lens 11 will, on the other hand, be identified, for convenience, hereinafter and in the claims as being "semi-opaque."

I am aware of the fact that broadly welder's shields with a plurality of sight openings of different degrees of transparency, which is the general purpose for which my shield is designed, are not new. The most notable example in the prior art of efforts to solve this problem is probably disclosed in the patent to Holt No. 1,861,797. In that case, the more transparent of the two lenses was arranged above the more opaque lens. The semi-opaque lens, since it is used most of the time and always used during the critical period during which the arc must be observed, must always be the larger of the two openings.

Due to the fact that the semi-transparent lens will transmit a substantial portion of the harmful rays, especially over a considerable period of time, it is necessary in all dual lens constructions of this character to provide means, or to have the lenses so arranged, that when the operator is viewing the arc through the semi-opaque lens, the semi-transparent lens will be in such a position that none of the arc rays may pass therethrough against the operator's face.

In my construction, this is accomplished by placing the semi-transparent lens below the semi-opaque lens, and also at an angle with respect thereto. With the lenses arranged as in my construction, illustrated for example in Fig. 2, the operator looks through the shield much as he would through a pair of bifocal spectacles. The head will be slightly raised in order to permit the operator to see the areas to be welded through the lower opening. When thus viewing the weld area, the operator may select the place to start the arc, accurately position the electrode with respect to the work, drop his head to bring his line of vision through the opening 11, and then safely strike the arc. In striking the arc, it is a natural reflex action of the operator to drop his chin, which automatically brings the semi-opaque lens into his line of vision, and he is therefore automatically protected at all times.

In the prior art structures, where the semi-transparent lens has been arranged above the semi-opaque lens, two difficulties were encountered:

First, the very nature of that arrangement required a forwardly extending projection or light barrier of substantial size in order that the semi-transparent lens be shielded during the maintenance of the arc.

The second objection, and perhaps the most important, was the fact that the movement of the operator's head immediately before the arc was struck, and in order to bring the semi-opaque lens into the line of vision, was an unnatural one. In other words, it is a natural reflex for the operator, at the instant the brilliant arc is struck, to drop his head in a gesture of self-protection. When doing so, and when equipped with my improved shield, the protective semi-opaque lens is brought into the line of vision.

It will be observed that the semi-opaque lens is, in my improved shield, supported in the normal forward line of sight of the wearer, and in a plane at substantially right angles to such normal forward line of sight. On the other hand, the semi-transparent lens is supported in a depressed line of forward sight of the wearer, and in a plane at a substantially right angle to such depressed line of sight. As thus arranged, it becomes unnecessary to provide any forwardly projecting barrier to cut off the transmission of the arc rays through the semi-transparent lens since, when the wearer's line of sight to the arc is through the semi-opaque opening, the angular relation to the arc of the opening in which the semi-transparent lens is mounted is such that no light will be transmitted therethrough from the arc. This latter condition is, in the illustrated structure, in a measure dependent upon the fact that the lower opening 9 in the light-impervious material is angularly related to the plane of the semi-transparent lens, and the further fact that the light impervious material extends upwardly for a short distance above the plane of the lower opening in the light-impervious material, so as to interpose between the two lenses a band of such material which at the same time depends as a hood in front of the lower, angularly inclined lens.

The location of the more or less transparent lens 10 in the lower portion of the rectangular housing, which also carries the substantially opaque lens, gives rise to a particular advantage as follows:

The welding operation is generally performed near surfaces which are quite efficient light reflectors, such as for example when welding in a closed space as in ship building construction, or even in factory rooms which have light ceilings, and the brilliant rays of the arc are reflected back from these surfaces toward the operator from a variety of different angles. With the semi-transparent lens 10 in the lower opening in the forwardly projecting lens housing, and with the operator's head lowered so that his line of sight passes through the lens 11, the principal surfaces which may reflect the arc rays through the opening 10 are the chest of the wearer and the floor and work areas immediately in front of him. These areas are generally dark, and thus with my improved shield very little light is thus reflected through the opening 10 as compared with the amount which would thus be reflected through the opening, were it positioned in the top of the lens housing for example.

I have thus provided a shield which, utilizing the natural reflexes of the operator, affords not only the maximum degree of protection, but also permits the operator to shift his line of vision from the semi-transparent to the semi-opaque opening as a truly unconscious rather than a conscious movement.

From the foregoing description of one specific embodiment of my invention as illustrated in Figs. 1 and 2, it will be observed that considerations of facility in manufacture and the like give rise to modifications in the manner in which the two lenses may be supported relatively to each other, as well as the angle lens D (10) is arranged relatively to lens C (11). It will also be obvious that with a different type of mounting for the two lenses, the angle therebetween might still be different without departing from the principles of the invention.

Other modes of applying the principle of the invention may be employed, change being made as regards the details described, provided the features stated in any of the following claims or the equivalent of such be employed.

I, therefore, particularly point out and distinctly claim as my invention:

1. A welder's shield comprising a face mask of light-impervious material arranged to be normally supported in front of the wearer's face and having an opening in its central portion, a box-like extension of light-impervious material over such opening, such extension having one opening in its forward wall and another opening in its lower wall, a semi-opaque lens in such first opening and a more transparent lens in such second opening.

2. A welder's shield comprising a face mask of light-impervious material arranged to be normally supported in front of the wearer's face and having an opening in its central portion, a box-like extension of light-impervious material over such opening, such extension having one opening in its forward wall and another opening in its lower wall, a semi-opaque lens in such first opening and a more transparent lens in such second opening, said last-named lens being inclined at an obtuse angle to said first-named lens.

3. A welder's shield comprising a mask of light-impervious material adapted to be supported in front of the wearer's face, two vertically adjacent lenses of different degrees of opacity inserted in said mask, the upper lens being the more opaque and the lower lens being mounted in a plane lying at an angle to the plane of the upper lens and intersecting such last-mentioned plane so that, in normal position of the wearer's head, light rays from the operation pass to the wearer's eyes through the lower, less opaque lens and upon downwardly inclining the wearer's head such rays pass through the upper, more opaque lens.

4. A welder's shield comprising a mask of light-impervious material adapted to be supported in front of the wearer's face, two vertically adjacent lenses of different degrees of opacity inserted in said mask, the upper lens being the more opaque and said lenses being so located in said mask that in normal position of the wearer's head light rays from the operation pass to the wearer's eyes through the lower, less opaque lens and upon downwardly inclining the wearer's head such rays pass through the upper, more opaque lens, and a band of such light-impervious material disposed to shield the lower, less opaque lens from such light rays when the wearer's head is thus inclined.

5. A welder's shield comprising a mask of light-impervious material adapted to be supported in front of the wearer's face, two vertically adjacent lenses of different degrees of opacity inserted in said mask, the upper lens being the more opaque, the lower, less opaque lens being inclined inwardly at an obtuse angle to said upper lens, the plane of such lower lens intersecting the plane of such upper lens so that in normal position of the wearer's head light rays from the operation pass to the wearer's eyes through the lower, less opaque lens and upon downwardly inclining the wearer's head such rays pass through the upper, more opaque lens.

6. A welder's shield comprising a mask of light-impervious material adapted to be supported in front of the wearer's face, two vertically adjacent lenses of different degrees of opacity inserted in said mask, the upper lens being the more opaque, the lower, less opaque lens being inclined inwardly at an obtuse angle to said upper lens, a band of such light-impervious material depending in front of said lower lens, and said lenses being so located in said mask that in normal position of the wearer's head light rays from the operation pass to the wearer's eyes through the lower, less opaque lens and upon downwardly inclining the wearer's head such rays pass through the upper, more opaque lens.

GEORGE G. LANDIS.